US008834202B2

(12) United States Patent
Kwasny et al.

(10) Patent No.: US 8,834,202 B2
(45) Date of Patent: Sep. 16, 2014

(54) CONNECTOR ASSEMBLY FOR VEHICLE CHARGING

(75) Inventors: Keith R. Kwasny, Northville, MI (US); Randall Riddle, Troy, MI (US); Marc Poulin, Chesterfield, MI (US); Michael Hardy, Ypsilanti, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 13/461,626

(22) Filed: May 1, 2012

(65) Prior Publication Data

US 2012/0315801 A1     Dec. 13, 2012

Related U.S. Application Data

(60) Provisional application No. 61/496,271, filed on Jun. 13, 2011, provisional application No. 61/496,296, filed on Jun. 13, 2011.

(51) Int. Cl.
*H01R 13/58* (2006.01)
*B60L 11/18* (2006.01)
*H01R 43/20* (2006.01)

(52) U.S. Cl.
CPC ............ *H01R 43/20* (2013.01); *Y02T 90/14* (2013.01); *H01R 2201/26* (2013.01); *B60L 11/1818* (2013.01); *Y02T 10/7088* (2013.01); *Y02T 90/121* (2013.01); *B60L 2270/34* (2013.01); *H01R 13/582* (2013.01); *Y02T 10/7005* (2013.01); *B06L 2270/32* (2013.01); *Y02T 90/128* (2013.01); *B60L 11/1825* (2013.01)
USPC ........................................................ 439/604

(58) Field of Classification Search
USPC .................................................. 439/604, 936
See application file for complete search history.

(56) References Cited

U.S. PATENT DOCUMENTS

| 3,634,806 | A | * | 1/1972 | Fergusson | 439/497 |
|---|---|---|---|---|---|
| 3,816,641 | A | * | 6/1974 | Iversen | 174/76 |
| 4,053,201 | A | * | 10/1977 | Grappe | 439/589 |
| 4,583,804 | A | * | 4/1986 | Thompson | 439/588 |
| 4,679,875 | A | | 7/1987 | Ramsey | |
| 5,350,312 | A | | 9/1994 | Kuno et al. | |
| 5,470,248 | A | | 11/1995 | Wood | |

(Continued)

FOREIGN PATENT DOCUMENTS

| CN | 101188319 A | 5/2008 |
|---|---|---|
| CN | 101425640 A | 5/2009 |

(Continued)

OTHER PUBLICATIONS

Non-Final Office Action dated Dec. 18, 2013 for U.S. Appl. No. 13/570,484.

(Continued)

*Primary Examiner* — Phuong Dinh
(74) *Attorney, Agent, or Firm* — Brooks Kushman, P.C.

(57) ABSTRACT

A connector assembly having a body is provided. The body forms an inlet, an internal cavity, and an outlet. A plate is oriented in the cavity and adjacent to the outlet. A harness partially extends through the inlet, into the cavity, and is connected to the plate. A molded material is disposed over the harness within the internal cavity on an inlet side of the plate. The molded material includes an integrally formed grommet that is oriented at the inlet of the body for providing strain relief to the harness.

17 Claims, 6 Drawing Sheets

(56) References Cited

U.S. PATENT DOCUMENTS

| | | | |
|---|---|---|---|
| 5,513,075 | A | 4/1996 | Capper et al. |
| 5,535,274 | A | 7/1996 | Braitberg et al. |
| 5,567,170 | A | 10/1996 | Kroeber |
| D375,721 | S | 11/1996 | Endo et al. |
| 5,575,675 | A | 11/1996 | Endo et al. |
| D379,967 | S | 6/1997 | Hashizawa et al. |
| 5,639,256 | A | 6/1997 | Endo et al. |
| D390,827 | S | 2/1998 | Sekimori et al. |
| 5,751,135 | A | 5/1998 | Fukushima et al. |
| 5,873,737 | A | 2/1999 | Hashizawa et al. |
| 6,123,569 | A * | 9/2000 | Fukushima et al. .......... 439/456 |
| 6,602,090 | B2 | 8/2003 | Kato |
| 7,530,826 | B2 | 5/2009 | Zeigler |
| 7,789,689 | B2 | 9/2010 | Frey et al. |
| 7,837,658 | B2 | 11/2010 | Cote et al. |
| 7,878,866 | B1 | 2/2011 | Kwasny et al. |
| D636,334 | S | 4/2011 | Kato et al. |
| 8,016,607 | B2 | 9/2011 | Brown, II |
| 8,052,468 | B2 * | 11/2011 | Crooijmans et al. .......... 439/604 |
| D655,242 | S | 3/2012 | Holthusen |
| 8,152,550 | B2 | 4/2012 | Ichio et al. |
| 8,206,171 | B2 | 6/2012 | Osawa et al. |
| D663,692 | S | 7/2012 | Sebald et al. |
| D666,152 | S | 8/2012 | Riddle et al. |
| D667,378 | S | 9/2012 | Yamamoto |
| D669,033 | S | 10/2012 | Senk et al. |
| 8,342,856 | B2 | 1/2013 | Takada et al. |
| D677,632 | S | 3/2013 | Riddle et al. |
| 8,506,315 | B2 * | 8/2013 | Canedo et al. ................. 439/310 |
| 8,573,998 | B2 | 11/2013 | Ichio |
| 8,586,879 | B2 | 11/2013 | Schadow et al. |
| D700,143 | S | 2/2014 | Ichio et al. |
| 2008/0045058 | A1 | 2/2008 | Stepniak et al. |
| 2008/0070433 | A1 | 3/2008 | Zeigler |
| 2010/0144191 | A1 | 6/2010 | Machado et al. |
| 2011/0034053 | A1 | 2/2011 | Matsumoto et al. |
| 2011/0070758 | A1 | 3/2011 | Poulin et al. |
| 2011/0097920 | A1 | 4/2011 | Amit et al. |
| 2011/0145141 | A1 | 6/2011 | Blain |
| 2011/0212645 | A1 | 9/2011 | Osawa et al. |

FOREIGN PATENT DOCUMENTS

| | | |
|---|---|---|
| CN | 101740947 A | 6/2010 |
| CN | 102017320 A | 4/2011 |
| DE | 19509336 A1 | 9/1995 |
| JP | 2010182461 A | 8/2010 |

OTHER PUBLICATIONS

Final Office Action dated May 13, 2014 for U.S. Appl. No. 13/570,484.

Chinese Office Action dated Mar. 31, 2014 for CN201210182767.1.

* cited by examiner

CONNECTOR ASSEMBLY FOR VEHICLE CHARGING

CROSS-REFERENCE TO RELATED APPLICATIONS

This application claims the benefit of U.S. provisional Application No. 61/496,271 filed Jun. 13, 2011, and U.S. provisional Application No. 61/496,296 filed Jun. 13, 2011, the disclosures of which are incorporated in their entirety by reference herein.

TECHNICAL FIELD

One or more embodiments relate to a connector assembly for facilitating the electrical charging of a vehicle.

BACKGROUND

One example of an electrical connector for vehicle charging is disclosed in U.S. Pat. No. 7,878,866 to Kwasny et. al.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
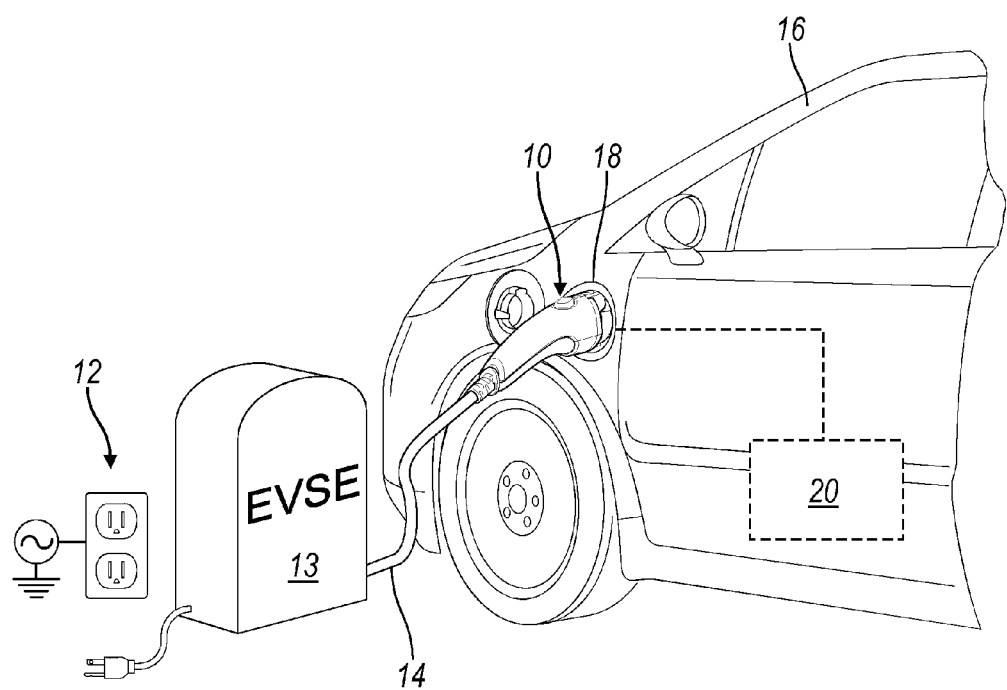
FIG. 1 is a schematic view of a connector assembly for electric vehicle charging according to one or more embodiments.

With reference to FIG. 1, a connector assembly for facilitating the electric charging of a vehicle is illustrated in accordance with an embodiment and is generally referenced by numeral 10. In general, the connector assembly 10 is configured to accommodate a number of different electrical harness configurations by interchanging a few internal components.

The connector assembly 10 is included in a cordset assembly 12, according to one or more embodiments. The cordset assembly 12 includes a connector for connecting to an external power supply for receiving electrical energy. The external power supply represents an AC electrical power supply, such as a standard residential power circuit. The cordset assembly 12 includes electric vehicle supply equipment (EVSE) 13 and a charging cable 14. The charging cable 14 extends between the EVSE 13 and the connector assembly 10. The EVSE 13 is configured to monitor electrical energy passing through the cable 14 during charging. The cordset assembly 12 may be configured to be portable (as shown in FIG. 1) or fixed to a charging station (not shown).

The connector assembly 10 attaches to a "plug-in" hybrid electric vehicle 16 for supplying electrical energy. The vehicle 16 includes a vehicle charging receptacle 18 that is connected to a battery 20 for receiving and storing electrical energy. The vehicle charging receptacle 18 is mounted to be externally accessible from the vehicle 16. The vehicle charging receptacle 18 receives the connector assembly 10. The battery 20 is electrically connected to the charging receptacle 18 for storing electrical power. The vehicle 16 may also include a converter (not shown) for converting AC to DC electrical power for storage in the battery 20.

Figure 2:
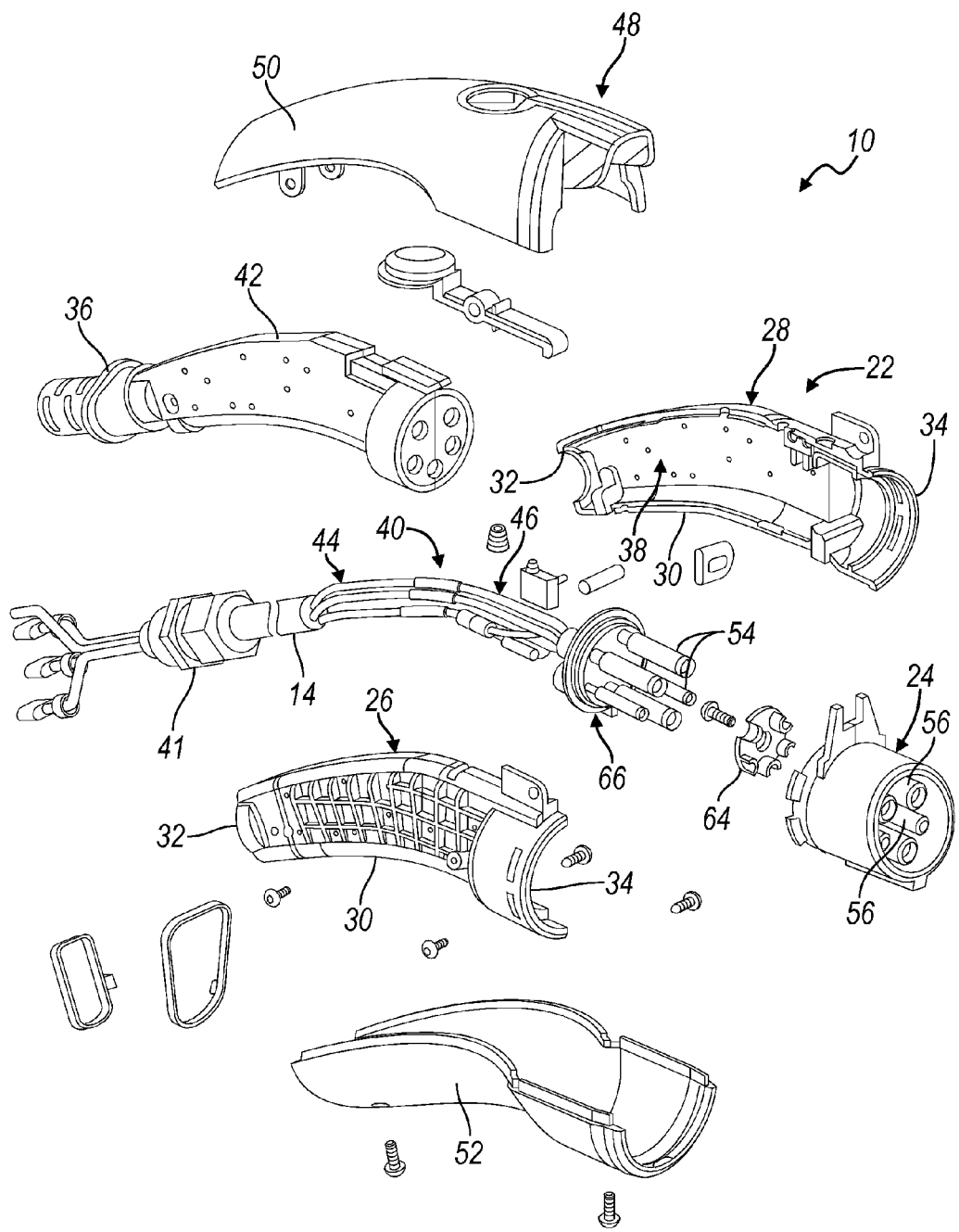
FIG. 2 is an exploded side perspective view of the connector assembly of FIG. 1.

FIG. 2 illustrates the connector assembly 10 of FIG. 1 in exploded view to illustrate internal components. The connector assembly 10 includes an enclosure 22 and a plug 24 that are connected to each other to provide a support structure. The enclosure 22 is formed as a elongate clamshell structure with a front portion 26 and a rear portion 28 that are attached to one another about a peripheral edge.

The enclosure 22 includes a body 30 with an inlet 32 and an outlet 34 formed at opposing longitudinal ends of the body 30. The inlet 32 is formed at a proximal end of the enclosure 22, and configured to receive the charging cable 14. In one or more embodiments, a flexible grommet 36 is attached to the cable 14 and received by the inlet 32 for providing strain relief and a seal between the cable 14 and the enclosure 22.

The outlet 34 is formed at a distal end of the enclosure 22 and is configured to connect to the plug 24. In one embodiment, the outlet 34 includes apertures that are sized to receive tabs that extend from the plug 24. In one or more embodiments, the outlet 34 is configured to disconnect from the plug 24 when the assembly 10 is subjected to a predetermined load to provide a "break-away" feature.

The body 30 forms a longitudinal internal cavity 38 for supporting the charging cable 14. The charging cable 14 includes a sheathing formed around a number of conductors, which are collectively referred to as an electrical harness 40. The sheathing insulates and protects the harness 40 along the length of the cable 14 outside of the connector assembly 10. The sheathing is removed from the portion of the electrical harness 40 that extends through the internal cavity 38. A fitting 41 is connected to charging cable 14 for securing the cable 14 to the EVSE 13.

The portion of the harness 40 located within the cavity 38 is encapsulated by a molded material 42 which is formed by a low-pressure molding process. In one embodiment the molded material 42 includes Macromelt® material by Henkel Corporation of Madison Heights, Mich. The molded material 42 helps insulate and seal the harness 40. In one or more embodiments, the grommet 36 is integrally formed with the molded material 42. Additional electronic components, such as a position sensor and a light source, such as a light emitting diode (LED) (not shown) may also be encapsulated within the body 30 by the molded material 42. The electrical harness 40 includes a main harness 44 and a jumper harness 46 that are connected to each other and partially encapsulated by the molded material 42 within the enclosure 22.

The plug 24 engages the vehicle charging receptacle 18 (shown in FIG. 1). An interface between the plug 24 and the vehicle charging receptacle 18 may be specified in an effort to standardize the connection throughout the electric vehicle industry. For example the Society of Automotive Engineers ("SAE") has specified such an interface in SAE-J1772, which is hereby incorporated by reference. However the connector assembly 10 is not limited by this SAE specification and may be utilized for applications specifying other interface requirements.

The connector assembly 10 includes a shell 48 that is disposed substantially over the enclosure 22 and the plug 24. The shell 48 helps retain and enclose the components of the connector assembly 10. In one or more embodiments, the shell 48 includes an upper shell portion 50 and a lower shell portion 52 that are each fastened to the enclosure 22.

Figure 3:
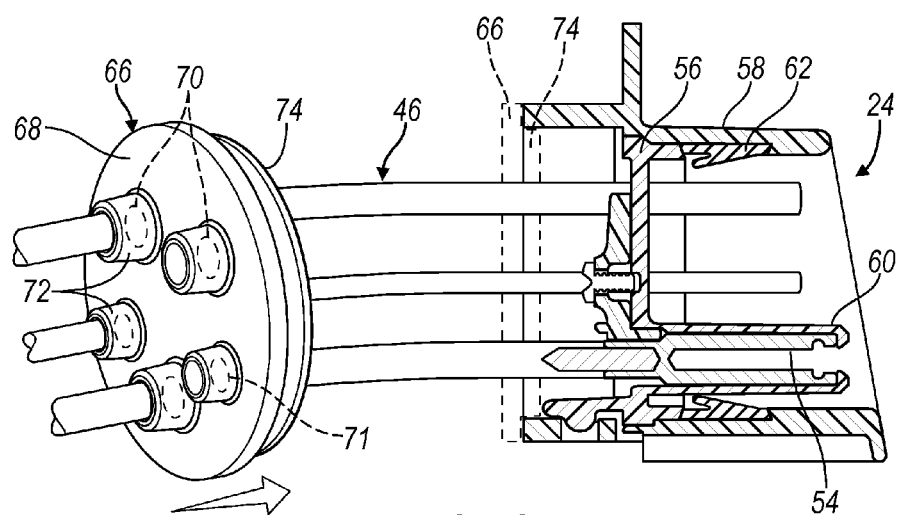
FIG. 3 is a side partial section view of a portion of the connector assembly of FIG. 1, illustrating a blocker plate.

Referring to FIG. 3, a terminal 54 is attached, (e.g., crimped or soldered) to a distal end of each conductor of the jumper harness 46. The plug 24 includes a terminal housing 56 that is secured within a shroud 58. The terminal housing 56 includes a plurality of terminal receptacles 60 that extend longitudinally through the plug 24. Each terminal 54 is inserted into a corresponding terminal receptacle 60. A wipe seal 62 is enclosed within the plug 24 and radially adjacent to the terminal receptacles 60. In one embodiment, the terminal housing 56 and the shroud 58 are attached to each other by ultrasonic welding. In another embodiment the terminal housing 56 and the shroud 58 are formed (e.g., molded) as a single component. In one or more embodiments, a retainer plate 64 is attached to an inner surface of the terminal housing 56 to retain the terminals 54 within the terminal receptacles 60.

The connector assembly 10 includes a blocker plate 66 for retaining the molded material 42 within the internal cavity 38 of the body 30. The blocker plate 66 prevents (or "blocks") the molded material 42 from entering the plug 24 during the molding process. The blocker plate 66 includes a base 68 with a number of apertures formed through the base 68 for receiving the conductors of the jumper harness 46. The apertures include large apertures 70 for receiving large conductors, and small apertures 71 for receiving small conductors. For brevity, only three of the five conductors of the jumper harness 46 are shown in FIG. 3. A boss 72 is formed about each aperture 70, 71 and extends transversely from the base 68. The blocker plate 66 includes an annular lip 74 that extends from the base 68 in an opposite direction as that of the bosses 72. The annular lip 74 is received within a proximal end of the plug 24 for locating the blocker plate 66 to the plug 24 (as shown in phantom view in FIG. 3).

Figure 4:
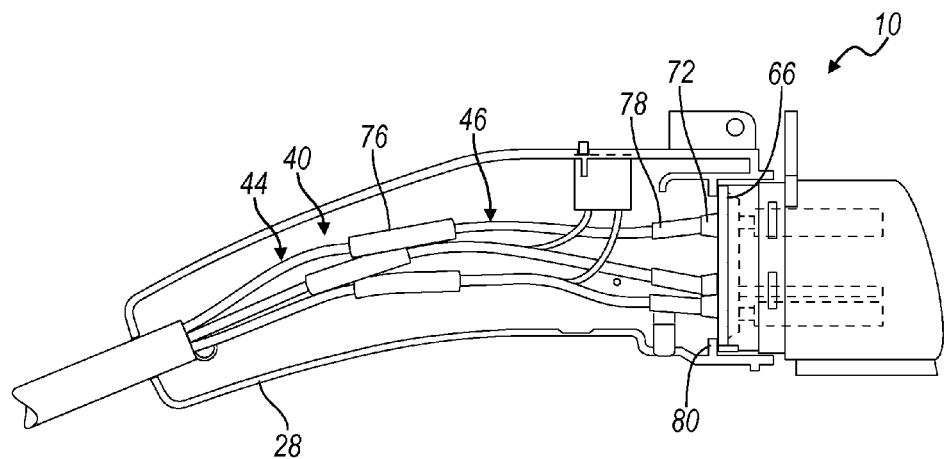
FIG. 4 is a side view of the connector assembly of FIG. 1, illustrated partially assembled.

With reference to FIG. 4, the jumper harness 46 includes the terminals 54 and a short length of wire (e.g. 50 to 150 mm). A first tube 76 and a second tube 78 are each installed over each jumper conductor 46, according to one or more embodiments. An end of each jumper conductor 46 is connected (e.g., soldered) to a corresponding end of each main harness conductor 44, and a first tube 76 is oriented over the connection. The first tube 76 decreases in size ("shrinks") when heated, to seal and electrically insulate each soldered connection. Each second tube 78 is oriented over a boss 72 and an adjacent portion of the jumper conductor 46 and then heated to seal the interface. The second tube 78 assists the blocker plate 66 to further block the molded material 42 from entering the plug 24. The electrical harness 40, including the main harness 44 and the jumper harness 46 along with the plug 24 are then installed into the enclosure 22.

Figure 5:
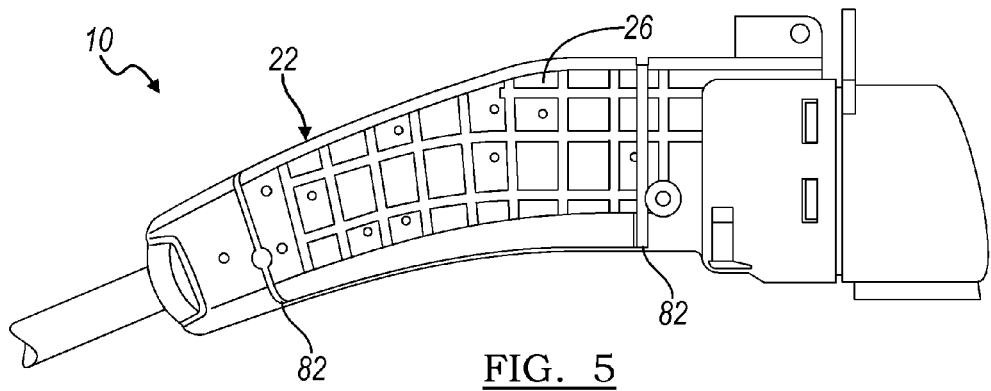
FIG. 5 is a side view of the connector assembly of FIG. 4, illustrated further assembled.

Referring to FIGS. 4 and 5, the electrical harness 40 and the plug 24 may be installed into the rear portion 28 of the enclosure 22 (as shown in FIG. 4). In one or more embodiments, the enclosure 22 includes a ledge 80 that extends radially inward about the outlet 34. The ledge 80 engages an inner surface of the blocker plate 66 for securing the blocker plate 66 about the first end of the plug 24. The front and rear portions 26, 28 of the enclosure 22 are attached to each other to enclose the electrical harness 40. In one embodiment a pair of straps 82 are wrapped around the enclosure 22 to hold the front portion 26 and rear portion 28 together, during the assembly process.

Figure 6:
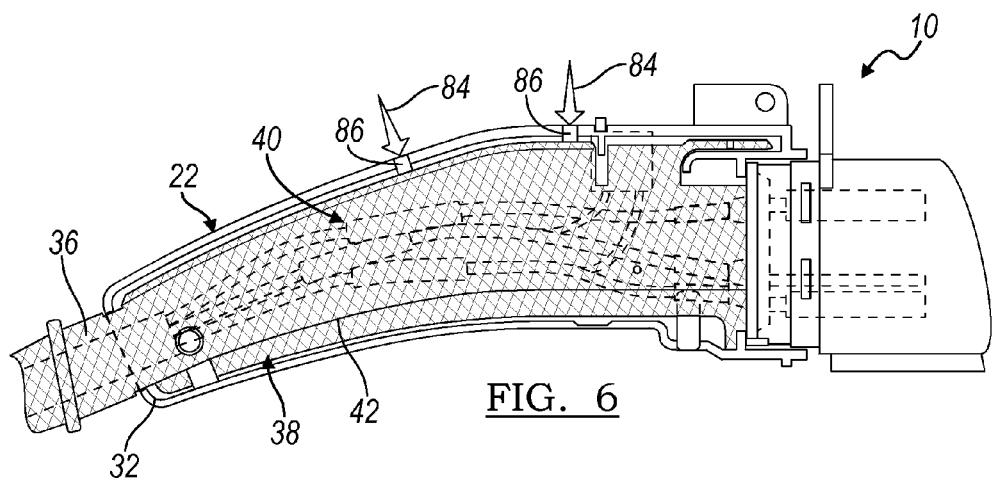
FIG. 6 is a side view of the connector assembly of FIG. 5, illustrated without a portion of an enclosure and with a molded material.

FIG. 6 illustrates the connector assembly 10 of FIG. 5, without the front portion 26 to illustrate the molding process. A liquid material, represented by arrows 84, is injected through apertures 86 that are formed through the enclosure 22. The liquid material 84 flows into the internal cavity 38 of the enclosure 22 and solidifies to form the molded material 42. The molded material 42 encapsulates the electrical harness 40 and other electronic components within the cavity 38. The molded material 42 also forms the grommet 36 about the inlet 32 of the enclosure 22 for providing strain relief for the charging cable 14. The blocker plate 66 prevents the molded material 42 from entering the plug 24.

Figure 7:
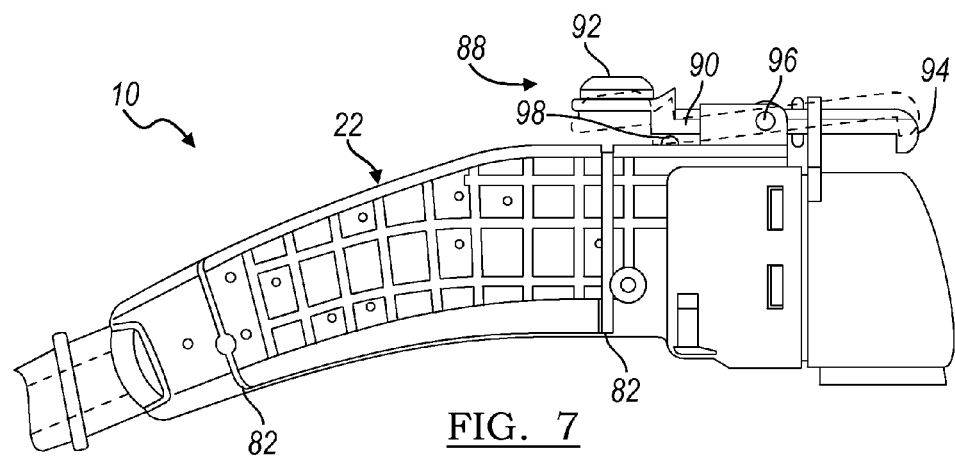
FIG. 7 is another side view of the connector assembly of FIG. 5, illustrated with a latching mechanism.

With reference to FIG. 7, the connector assembly 10 includes a latching mechanism 88 for attaching the connector assembly 10 to the charging receptacle 18. The latching mechanism 88 also prevents the connector assembly 10 from simply disconnecting from the vehicle 16 when a load is applied to the connector assembly 10. The latching mechanism 88 includes a lever 90 that is connected to an upper portion of the enclosure 22. A trigger 92 is formed at a proximal end of the lever 90 and configured to be depressed by an operators thumb. A latch 94 is formed at a distal end of the lever 90 and extends downward to engage the vehicle receptacle 18 (shown in FIG. 1).

The lever 90 is pivotally connected to the enclosure 22. A shaft 96 extends laterally through an intermediate portion of the lever 90 and is received by apertures formed in the enclosure 22. The lever 90 pivots about the shaft 96 between a latched position (shown in solid line) and an unlatched position (shown in phantom line). A compression spring 98 is provided for biasing the lever 90 in the latched position. The spring 98 is located between the lever 90 and the upper portion of the enclosure 22. By depressing the trigger 92 toward the enclosure 22, the spring 98 compresses and the latch 94 pivots counter-clockwise about the shaft 96 (as viewed in FIG. 7) and disconnects from the vehicle receptacle 18. Once the trigger 92 is released, the spring 98 exerts a force on the underside of the lever 90 to pivot the lever 90 back into the latched position. Thus the latching mechanism 88 allows a user to selectively attach the connector assembly 10 to the vehicle charging receptacle 18.

The illustrated embodiment of the connector assembly 10 depicts a five-terminal plug 24 that is designed according to the interface requirements of the SAE-J1772 specification. The terminals 54 are female terminals and configured to electrically connect with male terminals (or "pins") within the vehicle receptacle 18. The connector assembly 10 may include a number of different wiring configurations and sizes, while still meeting the SAE interface requirements.

The cordset assembly 12 may be configured to supply the vehicle 16 with lower charging current when the cordset 12 is a portable device, as compared to a fixed cordset 12 that is secured to a charging station. For example, in one embodiment a portable cordset 12 is configured to accommodate alternating current (AC) power at 110 Volts and up to 20 Amps. In another embodiment, the cordset 12 is configured to accommodate AC power at 220 Volts and up to 40 Amps. The diameter of a conductor, (gauge) is selected based on the amount of current passing through the conductor. Therefore conductors having larger diameters are used for cordsets that are rated at a higher current (e.g., 40 Amps). For example, in one embodiment a cordset 12 rated at 20 Amps includes power conductors (Line 1, Line 2/Neutral and Ground) with an American wire gage (AWG) of 14. In another embodiment, a cordset rated at 40 Amps includes power conductors between 8 and 10 AWG. The remaining two conductors are for transmitting low current signals (e.g., a proximity signal and a control pilot signal) and may be a common size (e.g., 18 AWG).

The connector assembly 10 is configured to accommodate different electrical harnesses by replacing a few interchangeable components. The interchangeable components include the blocker plate 66, the retainer plate 64 and the tubes 76, 78.

Figure 8:
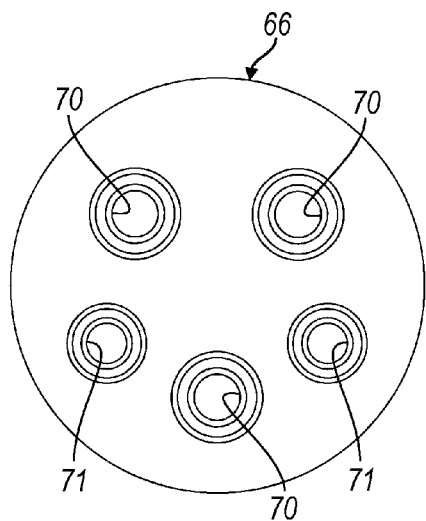
FIG. 8 is a rear view of the blocker plate of FIG. 3, according to one embodiment.
Figure 9:
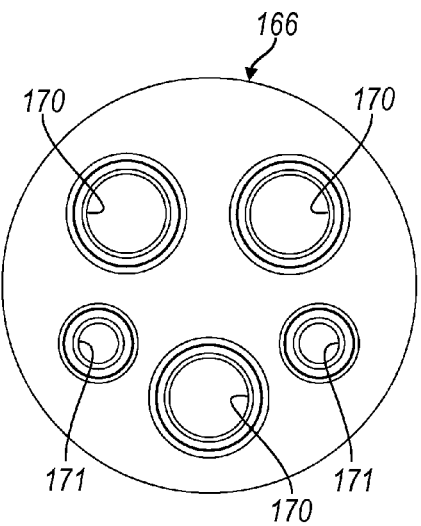
FIG. 9 is a rear view of the blocker plate of FIG. 3, according to another embodiment.

Referring to FIGS. 8 and 9, the blocker plate 66 may be selected based on the current rating and gage of the conductors of the electrical harness 40. FIG. 8 depicts the blocker plate 66, which includes large apertures 70 and small apertures 71 formed through the base 68. FIG. 9 depicts a second blocker plate 166 having a base 168 with a number of large apertures 170 and small apertures 171 formed through the base 168. The outer diameter of each base 68, 168 is the same, which allows the enclosure 22 to received either base 68, 168. However, the large apertures 70 of the blocker plate 66 are different from the large apertures 170 of the second blocker plate 166 to accommodate different gage conductors.

For example, in one embodiment the large apertures 70 of the blocker plate 66 have an inner diameter between 4.4 and 5.0 mm for receiving 14 AWG power conductors of a 20 Amp cordset. Whereas the large apertures of the second blocker plate 166 have an inner diameter between 6.4 and 8.3 mm for receiving 8-10 AWG power conductors of a 40 Amp cordset. The small apertures 71, 171 each have an inner diameter between 3.7 and 4.1 mm for receiving 18 AWG signal conductors. Similarly, the retainer plate 64 (shown in FIGS. 2 and 3) includes slots having different widths based on the gage of the conductor. Although two different wiring configurations are described, the connector assembly 10 is configured to accommodate more than two different wiring configurations, where a blocker plate and a retainer plate are provided for each configuration.

Figure 10:
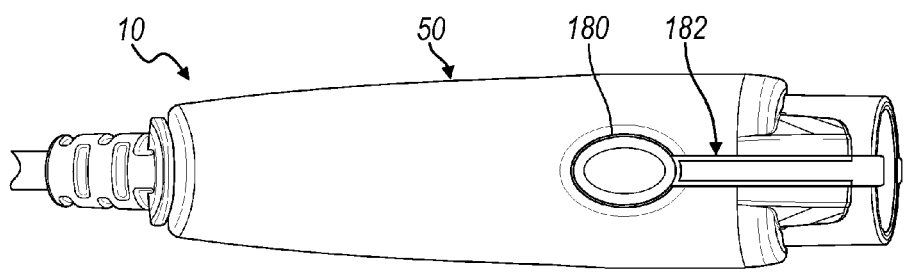
FIG. 10 is a top view of the connector assembly of FIG. 1 according to an embodiment.

Referring to FIG. 10, the upper shell portion 50 substantially encloses the latching mechanism 88. A hole 180 is formed through the upper shell portion 50 to allow external access to the trigger 92. The latch 94 extends longitudinally beyond a distal end of the upper shell portion 50.

The connector assembly 10 is also configured to accommodate the aesthetic requirements of different customers by offering a number of variations in the shell 48. For example, the shell 48 may be formed in a variety of different colors (not shown).

Figure 11:
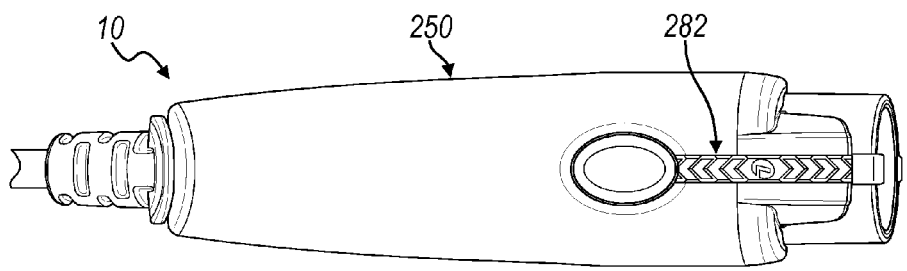
FIG. 11 is a top view of the connector assembly of FIG. 1 according to another embodiment.

With reference to FIGS. 10 and 11, the connector assembly 10 includes an interchangeable upper shell portion 50 with a number of different logos, according to one or more embodiments. A logo or indicia 182 is formed into a distal end of the upper shell portion 50 and adjacent to the hole 180. FIG. 11 depicts a second upper shell portion 250 having a more elaborate indicia 282 formed therein.

The upper shell portions 50, 250 are formed of a polymer using an injection molding process, according to one or more embodiments. During the process, a liquid polymer is injected into a cavity formed by one or more dies (not shown). An insert (not shown) may be attached to the die that corresponds to the indicia 182, 282. Therefore one set of dies may accommodate a number of different upper shell portions 50, 250 by attaching the corresponding insert. In one embodiment the shell portions 50, 250 are formed of a blend of polycarbonate and polyester resins, such as Makroblend® EL703 by Bayer.

Figure 12:
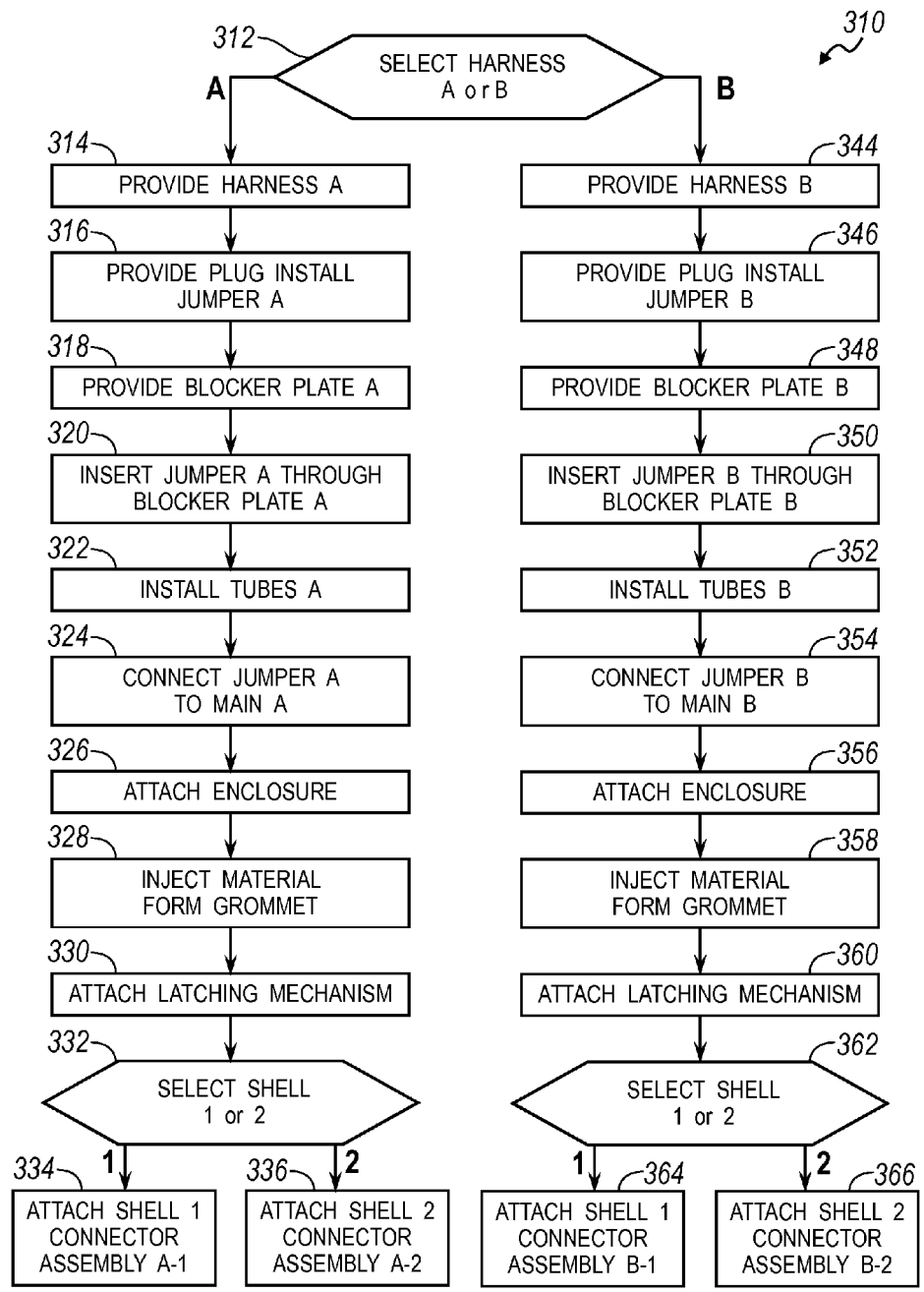
FIG. 12 is a flow chart illustrating a method for assembling the connector assembly of FIG. 1.

With reference to FIG. 12, a method for assembling the connector assembly 10 is illustrated in accordance with one or more embodiments and generally referenced by numeral 310. In operation 312 a harness is selected (either Harness A or Harness B) based on the electrical power requirements of an application. Harness A includes a charging cable with a main harness along with a jumper harness that are each configured for a first application. For example, Harness A includes 14 AWG power conductors for a 110 Volt, 20 Amp application, according to one embodiment. Harness B includes a charging cable with a main harness along with a jumper harness that are each configured for a second application. For example, Harness B includes 8-10 AWG power conductors for a 220 Volt, 40 Amp application, according to another embodiment. A female terminal is attached to an end of each conductor of the jumper harness. If Harness A is selected in operation 312, then the method proceeds to operation 314.

Harness A is provided in operation 314. In operation 316, a plug is provided having a plurality of terminal receptacles. The terminals of the jumper harness A are installed into the terminal receptacles. A first blocker plate (Blocker Plate A) is provided in operation 318. Blocker Plate A includes apertures that correspond to the gage of the conductors of Harness A. In operation 320, the ends of Jumper Harness A, that are opposite the terminals, are each inserted through corresponding apertures of Blocker Plate A. In operation 322, tubes (Tubes A) are installed over each conductor of the Jumper Harness A. Each Tube A has an inner diameter that corresponds to the gage of the corresponding conductor of Harness A.

In operation 324, Jumper Harness A is connected to Main Harness A. The Tubes A are oriented over the connection between Jumper Harness A and Main Harness A and heated to shrink and thereby provide a seal at the connection. In operation 326 the front portion and the rear portion of the enclosure are attached to each other about the Harness A and plug. A liquid material is injected into the enclosure at operation 328. The liquid material solidifies to form a molded material with an integrally formed grommet. Prior art electrical connectors include a separate grommet for providing strain relief. By integrally forming the grommet with the molded material, an operation of assembling the grommet to the charging cable may be eliminated from the assembly process. The molded material encapsulates the Harness A within the enclosure, and the grommet provides strain relief to the charging cable about the inlet of the enclosure. A latching mechanism is pivotally connected to an upper portion of the enclosure in operation 330.

A shell is selected in operation 332. Each shell (1 or 2) includes an upper and lower portion. Each upper shell includes an indicia that is formed into an outer surface of the shell. Additionally, Upper Shell 1 includes an indicia that is different from the indicia of Upper Shell 2. If Shell 1 is selected in operation 332, then the method proceeds to operation 334. In operation 334, Shell 1 is attached to the enclosure to form Connector Assembly A-1, where the designation "A" corresponds to Harness A, and the designation "1" corresponds to Shell 1. If Shell 2 is selected at operation 332, then the method proceeds to operation 336. In operation 336, Shell 2 is attached to the enclosure to form Connector Assembly A-2, where "A" corresponds to Harness A, and "2" corresponds to Shell 2.

If Harness B is selected in operation 312, then the method proceeds to operation 344. Harness B is provided in operation 344. In operation 346, a plug is provided having a plurality of terminal receptacles. The terminals of Jumper Harness B are installed into the terminal receptacles. A second blocker plate (Blocker Plate B) is provided in operation 348. Blocker Plate B includes apertures that correspond to the gage of the conductors of Harness B. In operation 350, the ends of Jumper Harness B, that are opposite the terminals, are each inserted through corresponding apertures of Blocker Plate B. In operation 352 tubes (Tubes B) are installed over each conductor of the Jumper Harness B. Each Tube B has an inner diameter that corresponds to the gage of the corresponding conductor of Harness B.

In operation 354, Jumper Harness B is connected to Main Harness B. The Tubes B are oriented over the connection between Jumper Harness B and Main Harness B and heated to shrink and thereby provide a seal at the connection. In operation 356, the front portion and the rear portion of the enclosure are attached to each other about the Harness B and the plug. A liquid material is injected into the enclosure at operation 358. The liquid material solidifies to form a molded material with an integrally formed grommet. The molded material encapsulates the Harness B within the enclosure, and the grommet provides strain relief to the charging cable about the inlet of the enclosure. A latching mechanism is pivotally connected to an upper portion of the enclosure in operation 360.

A shell (1 or 2) is selected in operation 362. If Shell 1 is selected in operation 362, then the method proceeds to operation 364. In operation 364, Shell 1 is attached to the enclosure to form Connector Assembly B-1, where the designation "B" corresponds to Harness B, and the designation "1" corresponds to Shell 1. If Shell 2 is selected at operation 362, then the method proceeds to operation 366. In operation 366, Shell 2 is attached to the enclosure to form Connector Assembly B-2, where "B" corresponds to Harness B, and "2" corresponds to Shell 2.

Although the method 310 is described as selecting from two different harnesses and two different shells, other embodiments of the method contemplate selections from more different combinations.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A connector assembly comprising:
   a body forming an inlet, an internal cavity, and an outlet;
   a plate oriented in the internal cavity adjacent to the outlet, the plate having a base with a plurality of apertures formed therethrough and a boss formed about each aperture and extending from the base;
   a harness partially extending through the inlet, into the internal cavity, and connected to the plate;
   a molded material disposed over the harness within the internal cavity on an inlet side of the plate; and
   a plug with a first end attached to the outlet of the body, and a second end oriented opposite to the first end adapted to engage a vehicle charging receptacle, wherein the plate encloses the internal cavity to maintain the molded material on the inlet side;
   wherein a conductor of the harness extends through each boss and aperture, and wherein a tube is disposed over each boss and extends over a portion of the corresponding conductor to form a seal between the internal cavity and the plug.

2. The connector assembly of claim 1 wherein the body comprises a ledge extending radially inward and into the internal cavity, the ledge being longitudinally spaced from the outlet to abut the plate.

3. The connector assembly of claim 1 further comprising a latching mechanism connected to an external portion of the body for selectively attaching to a vehicle charging receptacle.

4. The connector assembly of claim 1 further comprising a lever having an elongate shape with a trigger formed at a first end and a latch formed at a second end, with an intermediate portion therebetween, the lever being pivotally connected to the body about the intermediate portion.

5. The connector assembly of claim 4 further comprising a shell disposed over the body, the shell having an aperture formed through and oriented with the trigger such that the trigger is externally accessible.

6. The connector assembly of claim 5 wherein the shell further comprises indicia formed therein and adjacent to the aperture, such that the indicia are externally visible.

7. A connector assembly comprising:
   a body forming an inlet, an internal cavity, and an outlet;
   a plate oriented in the internal cavity and adjacent to the outlet, the plate having a base with a plurality of apertures formed therethrough and a boss formed about each aperture and extending from the base;
   a harness partially extending through the inlet, into the internal cavity;
   a molded material disposed over the harness within the internal cavity, the molded material having an integrally formed grommet oriented at the inlet of the body for providing strain relief to the harness; and
   a plug with a first end attached to the outlet of the body, and a second end opposite the first end for engaging a vehicle charging receptacle;
   wherein a conductor of the harness extends through each boss and aperture, and wherein a tube is disposed over each boss and extends over a portion of the corresponding conductor to form a seal between the internal cavity and the plug.

8. The connector assembly of claim 7 further comprising a lever having an elongate shape with a trigger formed at a first end and a latch formed at a second end, with an intermediate portion therebetween, the lever being pivotally connected to the body about the intermediate portion.

9. The connector assembly of claim 8 further comprising a shell disposed over the body, the shell having an aperture formed through and oriented with the trigger such that the trigger is externally accessible.

10. The connector assembly of claim 9 wherein the shell further comprises indicia formed therein and adjacent to the aperture, such that the indicia are externally visible.

11. A method for assembling a connector assembly, the method comprising:
    selecting a harness type from a plurality of harness types;
    installing a jumper harness of the selected harness type to a plug;
    inserting the jumper harness into a plate of the selected harness type; and connecting the jumper harness to a main harness of the selected harness type.

12. The method of claim 11 further comprising:

installing at least one tube of the selected harness type over a conductor of the jumper harness;

orienting the tube over a connection between the jumper harness and the main harness; and heating the tube, whereby the tube shrinks to form a seal over the connection.

13. The method of claim 11 further comprising:

installing at least one tube of the selected harness type over a conductor of the jumper harness;

orienting the tube over an interface between the jumper harness and the plate; and heating the tube, whereby the tube shrinks to form a seal over the interface.

14. The method of claim 11 further comprising:

providing a body having an inlet, an internal cavity, and an outlet;

connecting the plug to the outlet of the body such that the jumper harness and the main harness extend through the internal cavity formed in the body; and molding a material within the internal cavity that encapsulates the main harness and the jumper harness, wherein the plate prevents the material from entering the plug.

15. The method of claim 14 further comprising:

providing a lever having a first end, a second end and an intermediate portion extending therebetween; and connecting the intermediate portion of the lever to an upper portion of the body.

16. The method of claim 14 further comprising:

selecting a shell type from a plurality of shell types, wherein each shell type comprises an upper shell portion having indicia formed therein; and attaching the upper shell portion to the body.

17. The method of claim 16 further comprising:

selecting an insert corresponding to the indicia of the selected shell type;

attaching the inset to a die; and molding the upper shell portion of the selected shell type.

* * * * *